United States Patent
Oran et al.

(10) Patent No.: US 7,194,354 B1
(45) Date of Patent: Mar. 20, 2007

(54) SYSTEM FOR DISCOVERING AND MAINTAINING GEOGRAPHIC LOCATION INFORMATION IN A COMPUTER NETWORK TO ENABLE EMERGENCY SERVICES

(75) Inventors: David R. Oran, Acton, MA (US); Silvano Gai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 135 days.

(21) Appl. No.: 10/697,896

(22) Filed: Oct. 30, 2003

Related U.S. Application Data (63) Continuation of application No. 09/884,239, filed on Jun. 19, 2001, now Pat. No. 6,665,611.

(51) Int. Cl.
 *G06F 3/00* (2006.01)
 *H04M 1/56* (2006.01)
 *G01C 21/00* (2006.01)
(52) U.S. Cl. .................. 701/207; 710/9; 379/142.1; 455/456.3; 370/351
(58) Field of Classification Search ............... 710/9, 710/8; 379/45, 142.1, 201.06, 37; 370/351
See application file for complete search history.

(56) References Cited

U.S. PATENT DOCUMENTS 3,702,477 A 11/1972 Brown
6,092,096 A 7/2000 Lewis
6,236,652 B1 * 5/2001 Preston et al. ............... 370/349
6,308,134 B1 10/2001 Croyle et al.

(Continued)

OTHER PUBLICATIONS

Network-Based Application Recognition, Cisco Systems, Inc., (c) 1992-2001, pp. 1-40.

(Continued)

*Primary Examiner*—Thomas Black
*Assistant Examiner*—Christine M. Behncke
(74) *Attorney, Agent, or Firm*—Cesari and McKenna LLP (57) ABSTRACT

A system automatically discovers and maintains geographic location information for entities and devices making up a computer network. The system preferably includes a computing unit and a geographic location generator, such as a Global Positioning System (GPS) receiver. The computing unit includes a location discovery entity and a message generator. The GPS receiver, which is mounted to and in communication with the computing unit, may be augmented with an inertial navigation unit to facilitate the generation of location information inside of buildings where GPS signals can be difficult to receive. The computing unit further includes a network communications facility so that it can communicate with one or more network devices, such as a network switch. The switch includes a location recording/reporting entity and a location database. Physical coordinates of network entities or devices are obtained by the GPS receiver and/or inertial navigation unit and transmitted to the network switch, and the recording/reporting entity stores the physical coordinates at the location database.

17 Claims, 8 Drawing Sheets

U.S. PATENT DOCUMENTS

| | | | |
|---|---|---|---|
| 6,484,033 B2* | 11/2002 | Murray | 455/456.3 |
| 6,515,985 B2* | 2/2003 | Shmulevich et al. | 370/356 |
| 6,526,341 B1* | 2/2003 | Bird et al. | 701/35 |
| 6,650,901 B1* | 11/2003 | Schuster et al. | 455/456.1 |
| 6,654,382 B1* | 11/2003 | Bare et al. | 370/463 |
| 6,665,611 B1* | 12/2003 | Oran et al. | 701/213 |
| 6,778,524 B1* | 8/2004 | Augart | 370/351 |
| 6,795,710 B1* | 9/2004 | Creemer | 455/456.3 |
| 6,947,755 B1* | 9/2005 | Gould et al. | 455/456.5 |
| 6,975,619 B1* | 12/2005 | Byers et al. | 370/351 |
| 2001/0026240 A1* | 10/2001 | Neher | 342/357.07 |
| 2002/0032787 A1* | 3/2002 | Overton et al. | 709/230 |
| 2002/0059420 A1* | 5/2002 | Lin et al. | 709/224 |
| 2002/0126701 A1* | 9/2002 | Requena | 370/469 |
| 2002/0145561 A1* | 10/2002 | Sandhu et al. | 342/357.09 |
| 2002/0160745 A1* | 10/2002 | Wang | 455/404 |
| 2002/0164952 A1* | 11/2002 | Singhal et al. | 455/41 |
| 2003/0014186 A1* | 1/2003 | Adams et al. | 701/207 |
| 2003/0197643 A1* | 10/2003 | Fullerton et al. | 342/387 |
| 2004/0088345 A1* | 5/2004 | Zellner et al. | 709/200 |

OTHER PUBLICATIONS

Dixon, Jonathan, Global Reference Navigation for Mobile Robots: Issues in Prtactical Implementation, Mobile Robot Navigation, May 27, 1997, pp. 1-8.

Dixon, J. and Henlich, O., Mobile Robot Navigation, Final Report, Jun. 10, 1997, pp. 1-28.

Davis, C. et al., A Means for Expressing Location Information in the Domain Name System, Network Working Group, Request For Comments: (RFC) 1876, Jan. 1996, pp. 1-15.

Whitaker, J., Radio Frequency Transmission Systems Design and Operation, (c) 1991, pp. i-ix and 375-379

Grewal, M., Weill, L. and Andrews, A., Global Positioning Systems, Intertial Navigation, and Integration, (c) 2001, iii- vii, 179-224 and 252-264.

* cited by examiner

SYSTEM FOR DISCOVERING AND MAINTAINING GEOGRAPHIC LOCATION INFORMATION IN A COMPUTER NETWORK TO ENABLE EMERGENCY SERVICES

This application is a continuation of application Ser. No. 09/884,239, filed Jun. 19, 2001 now U.S. Pat. No. 6,665,611.

BACKGROUND OF THE INVENTION

1. Field of the Invention

This invention relates to computer networks, and more specifically, to a system for discovering and storing location information for network entities or devices.

2. Background Information

Computer networks typically comprise a plurality of interconnected network entities. A network entity may consist of any device, such as a computer or end station, that "sources" (i.e., transmits) or "sinks" (i.e., receives) datagrams (e.g., packets and/or frames). A common type of computer network is a local area network ("LAN") which typically refers to a privately owned network within a single building or campus. LANs typically employ a data communication protocol (LAN standard), such as Ethernet, FDDI or token ring, that defines the functions performed by the data link and physical layers of a communications architecture (i.e., a protocol stack). In many instances, several LANs may be interconnected by point-to-point links, microwave transceivers, satellite hook-ups, etc. to form a wide area network ("WAN") or intranet that may span an entire country or continent.

One or more intermediate network devices are often used to couple LANs together and allow the corresponding network entities to exchange information. For example, a bridge may be used to provide an interconnecting function between two or more LANs. Alternatively, a switch may be utilized to provide a "switching" function for transferring information between a plurality of LANs or end stations. Bridges and switches may operate at various levels or layers of a communication protocol stack. For example, a switch may operate at layer 2 which, in the Open Systems Interconnection (OSI) Reference Model, is called the data link layer and includes the Logical Link Control (LLC) and Media Access Control (MAC) sub-layers. Frames at the data link layer typically include a header containing the MAC address of the entity sourcing the message, referred to as the source address, and the MAC address of the entity to whom the message is being sent, referred to as the destination address. To perform the switching function, layer 2 switches examine the MAC destination address of each data frame received on a source port. The frame is then switched onto and driven from the destination port(s) associated with that MAC destination address.

Other network devices, commonly referred to as routers, may operate at higher communication layers, such as layer 3 of the OSI Reference Model, which in TCP/IP networks corresponds to the Internet Protocol (IP) layer. Data frames at the IP layer also include a header which contains an IP source address and an IP destination address. Routers or layer 3 switches may re-assemble or convert received data frames from one LAN standard (e.g., Ethernet) to another (e.g. token ring). Thus, layer 3 devices are often used to interconnect dissimilar subnetworks. Many equipment manufacturers include both layer 2 switching and layer 3 routing functions in a single device.

Often, it is desirable to obtain information about where specific network entities, such as end stations, servers, switches, etc., or specific devices are physically located. For example, network administrators may wish to perform inventories on the equipment making up their computer networks. This information can then be used in determining maintenance schedules, among other applications. Currently, only manual systems exist for collecting and storing such information. Specifically, the network administrator would visit each location, write down identifying information for the network equipment at that location and then enter this information in some type of data base, such as a spreadsheet. Because the creations of such manual inventories are so time consuming, they are rarely performed. They are also error-prone, resulting in the data base having incorrect information. As a result, few network administrators have access to such information even though it could facilitate many applications.

Enhanced 911 Emergency Calling Services

Many communities provide enhanced 911 (E911) emergency telephone calling services. With E911, emergency operators receive the location of 911 calls as well as the telephone number from which the call originated. Location information is obtained from an Automation Location Information (ALI) database. Telephone subscriber information, e.g., name, address, telephone number, is typically used to build the ALI database. For organizations using a private branch exchange (PBX) telephone switch, however, subscriber information is often limited to the organization's name and its main address. As a result, the "address" displayed to emergency operators who receive a 911 call from inside a PBX can be imprecise or even far away from the caller's actual location. In this case, the operator must obtain location information from the caller defeating a major purpose of E911 services.

It is an object of the present invention to provide a system for discovering location information for network entities and devices that is neither time-consuming nor error prone.

It is a further object of the present invention to utilize location information in requests for emergency services.

SUMMARY OF THE INVENTION

Briefly, the present invention is directed to a system for discovering and maintaining geographic location information for computer networks. In accordance with a preferred embodiment, the system includes a computing unit, such as a laptop, notebook or palm personal computer (PC), and a geographic location generator, such as a Global Positioning System (GPS) receiver. The computing unit includes a location discovery entity and a message generator. The GPS receiver, which is mounted to and in communication with the computing unit, may be augmented with an inertial navigation unit to facilitate the generation of location information inside of buildings where GPS signals can be difficult to receive. The computing unit further includes a network interface card (NIC) so that it can communicate with one or more network devices, such as a network switch. The switch includes a location recording/reporting entity and a location database. The recording/reporting entity is configured to receive and recognize messages from the computing unit, and to store information at the location database.

In operation, a user, such as a network administrator, takes the computing unit to a network site for which geographic location information is desired. The GPS receiver is activated to obtain physical coordinates of the site. If the GPS receiver is unable to obtain the coordinates, e.g., due to a weak satellite signal, the user may take the system to a substitute spot where such coordinates can be obtained, e.g., a window. The user then initializes or zeros the inertial navigation unit and returns to the site of interest. The coordinates from the substitute spot are then adjusted by the signals produced by the inertial navigation system so as to produce physical coordinates for the network site of interest.

The physical coordinates are then loaded into a network message and sent to the switch by the computing unit. Specifically, the computing unit's NIC may be connected to a network outlet that is disposed at the site of interest and coupled to the network device. The network device receives the message across the network, and notes the device port on which it was received. The network device then recovers the physical coordinates from the message and stores this information along with a port identifier (ID) in its location database. The geographic location of the network site can thus be bound to a port ID of the network device.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
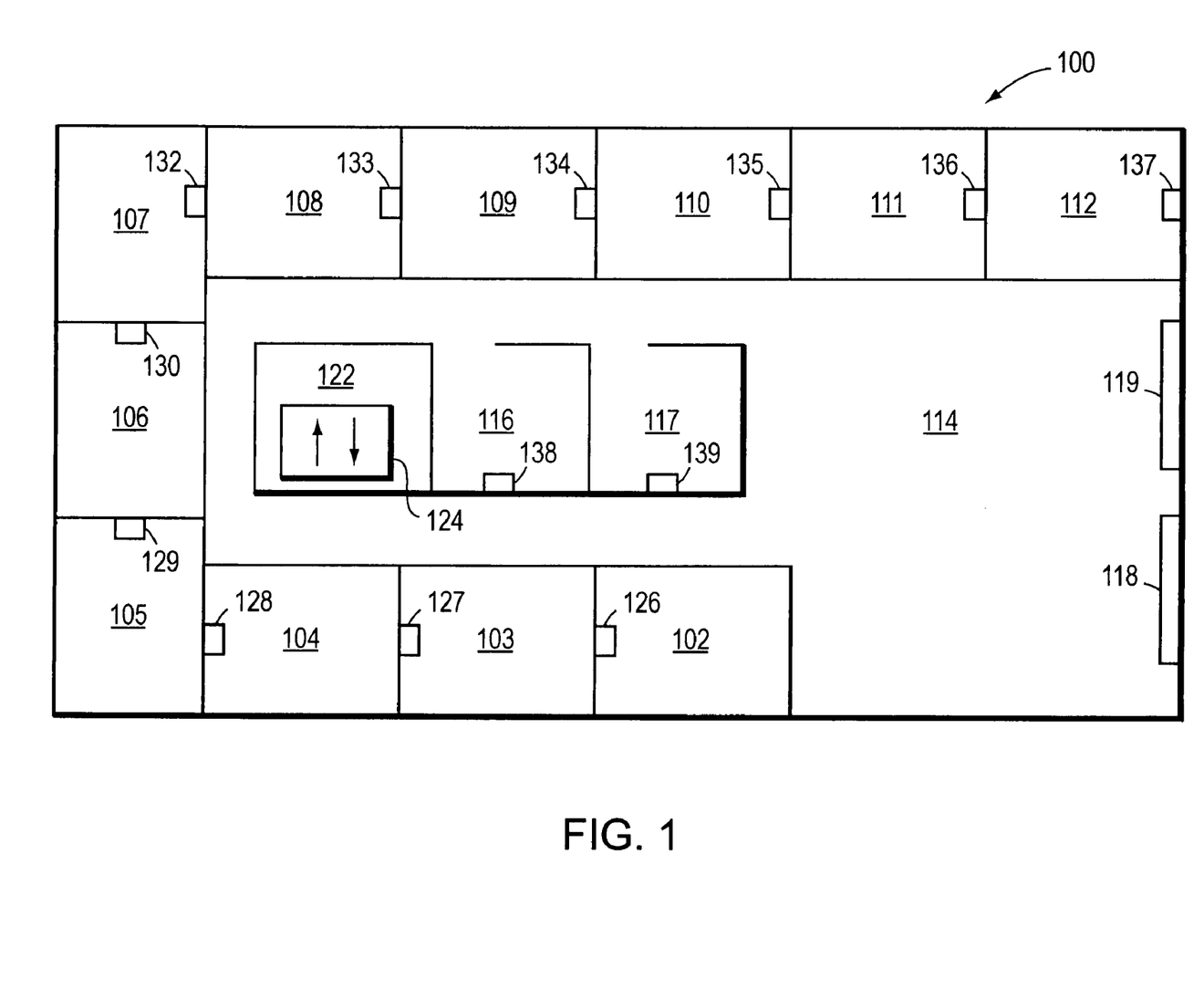
FIG. 1 is a plan view of an exemplary office layout in which the present invention may be advantageously utilized.

FIG. 1 is a plan view of an exemplary office layout 100. The office layout 100 includes a plurality of offices 102–112, a lobby 114 and two cubicles 116–117. Disposed along an exterior wall of the lobby 114 are two windows 118–119. The office layout 100 further includes a wiring closet 122. Located within the wiring closet 122 are one or more intermediate network devices, such as a network switch 124. Disposed within each office 102–112 and within each cubicle 116–117 is a network connector or outlet 126–139. The network outlets 126–139 are all radially wired to the wiring closet 122 in a conventional manner. Furthermore, as described below, each outlet 126–139 is preferably coupled to a respective port of the network switch 124. Network entities, such as personal computers, printers, scanners, etc. (not shown) may be coupled to the various network outlets 126–139 within the offices 102–112 and cubicles 116–117. Switch 124 provides a switching function among its various ports so as to create a computer network from the network entities coupled to outlets 126–139, and to provide interconnection with other networks via conventional routing and bridging technologies.

Figure 2:
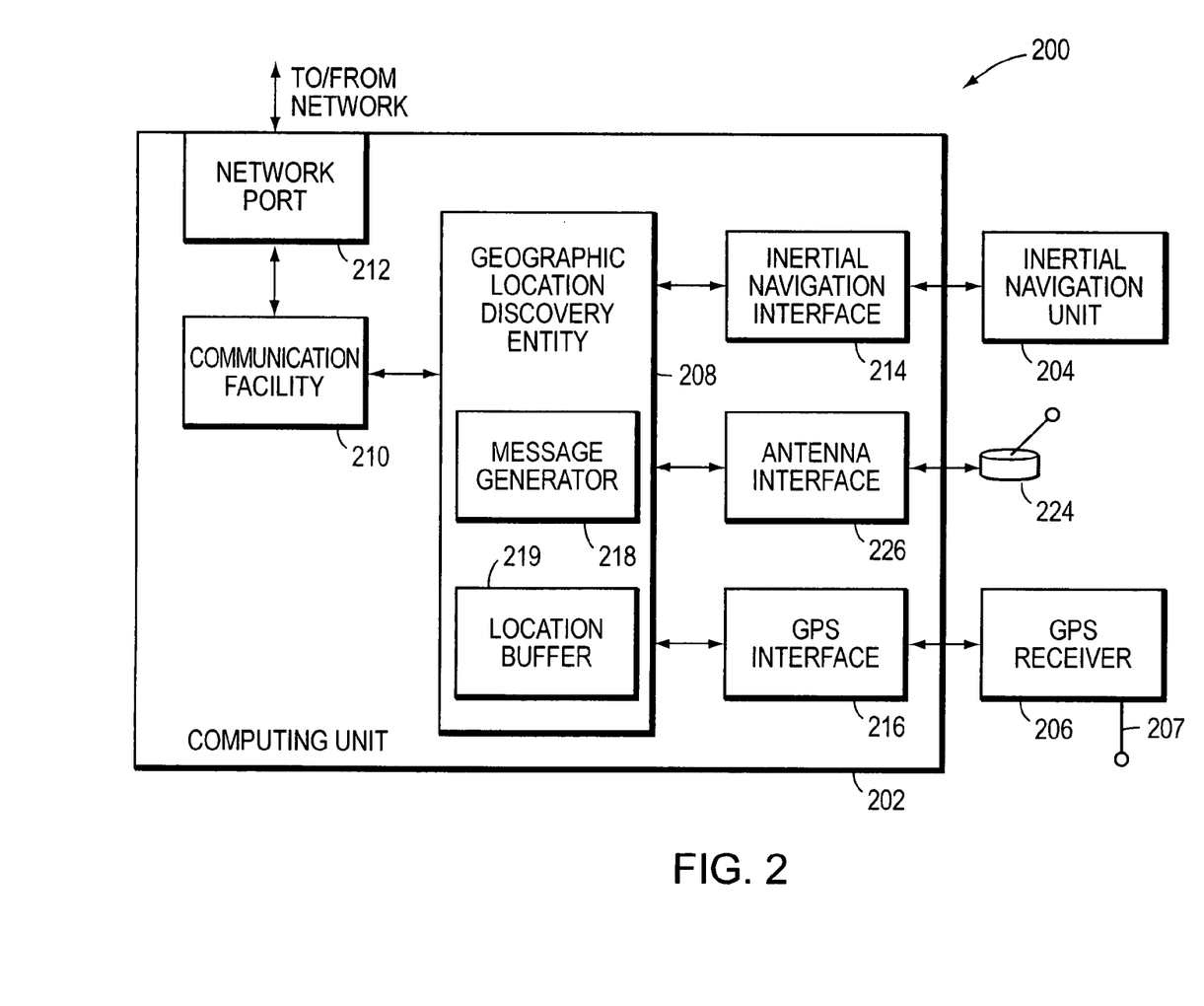
FIG. 2 is a highly schematic block diagram of a location discovery system in accordance with the present invention.

FIG. 2 is a highly schematic, functional block diagram of a location discovery system 200 in accordance with the present invention. Discovery system 200 includes a computing unit 202, and a location generator, which in the preferred embodiment includes an inertial navigation unit 204 and a Global Positioning System (GPS) receiver 206. Disposed on the computing unit 202 are a geographic location discovery entity 208, a communication facility 210, a network connector or port 212, an inertial navigation interface circuit 214 and a GPS interface circuit 216. The communication facility 210 is in communicating relationship with the network port 212 so that messages may be exchanged between the computing unit 202 and various network entities of the computer network of FIG. 1, including network switch 124, as described below. The location discovery entity 208, moreover, has a message generator 218 and a location buffer 219, and is in communicating relationship with the communication facility 210 in order to transmit messages to and receive messages from the computer network of FIG. 1. Entity 208 is also in communicating relationship with the inertial navigation interface circuit 214 and the GPS interface circuit 216, which in turn are coupled to units 204 and 206, respectively. Accordingly, information, such as physical coordinates, acquired by units 204 and 206 can be passed to and processed by the discovery entity 208 as described herein.

Computing unit 202 also includes one or more input devices, such as a keyboard and a mouse, and one or more output devices, such as a display monitor. In the preferred embodiment, the computing unit 202 is a portable, personal computer (PC), such as a laptop, notebook or palm PC. Suitable computing platforms for use with the present invention include the Presario and/or Armada series of laptop computers from Compaq Computer Corp. of Houston, Tex., the Inspiron and/or Latitude series of notebook computers from Dell Computer Corp. of Austin, Tex. and the iPAQ series of palm PCs from Compaq Computer Corp., among others. Those skilled in the art will recognize that other computer platforms may be advantageously utilized with the present invention.

GPS receiver 206 has an antenna 207 for receiving signals from a plurality of GPS satellites orbiting the Earth. Suitable GPS receivers for use with the present invention are commercially available from such manufacturers as Trimble Navigation Ltd., Motorola, Inc., Conexant Systems Inc., and Sony Corporation, among others. GPS interface 216 represents software and/or hardware for interfacing GPS receiver signals to a personal computer. Such software and/or hardware is commercially available. The GPS receiver 206 may be connected to a serial port, such as an RS232 port, a parallel port, a Universal Serial Port (USP), and/or an IEEE 1394/Firewire port of computing unit 202 by a respective cable, or it may be built into the computing unit 202 itself.

The inertial navigation unit 204 preferably includes a plurality of gyroscopes, such as ring laser gyros, and accelerometers so as to detect both rotational and linear movement. Suitable inertial navigation units are available from Honeywell of Minneapolis, Minn., Inertial Science Inc. of Newbury Park, Calif., and Litton Systems, Inc. of Woodland Hills, Calif., among others. A preferred inertial navigation unit is the Micro-Electromechanical Sensor (MEMS) Inertial Navigation System (INS), which is currently being developed by the Defense Advanced Research Projects Agency (DARPA). Inertial navigation interface 214 similarly represents software and/or hardware for interfacing inertial navigation signals to a personal computer. The inertial navigation unit 204 may be connected to a serial port, such as an RS232 port, a parallel port, a Universal Serial Port (USP), and/or an IEEE 1394/Firewire port of computing unit 202 by a respective cable, or built into the computing unit 202 itself.

System 200 may also include one or more antennas, such as antenna 224, configured to receive signals, such as radio beacon or Ultra Wideband (UWB) radio signals. An antenna interface 226 at the computing unit 202 receives the signals captured by the antenna 224 and provides them to the discovery entity 208.

Figure 3:
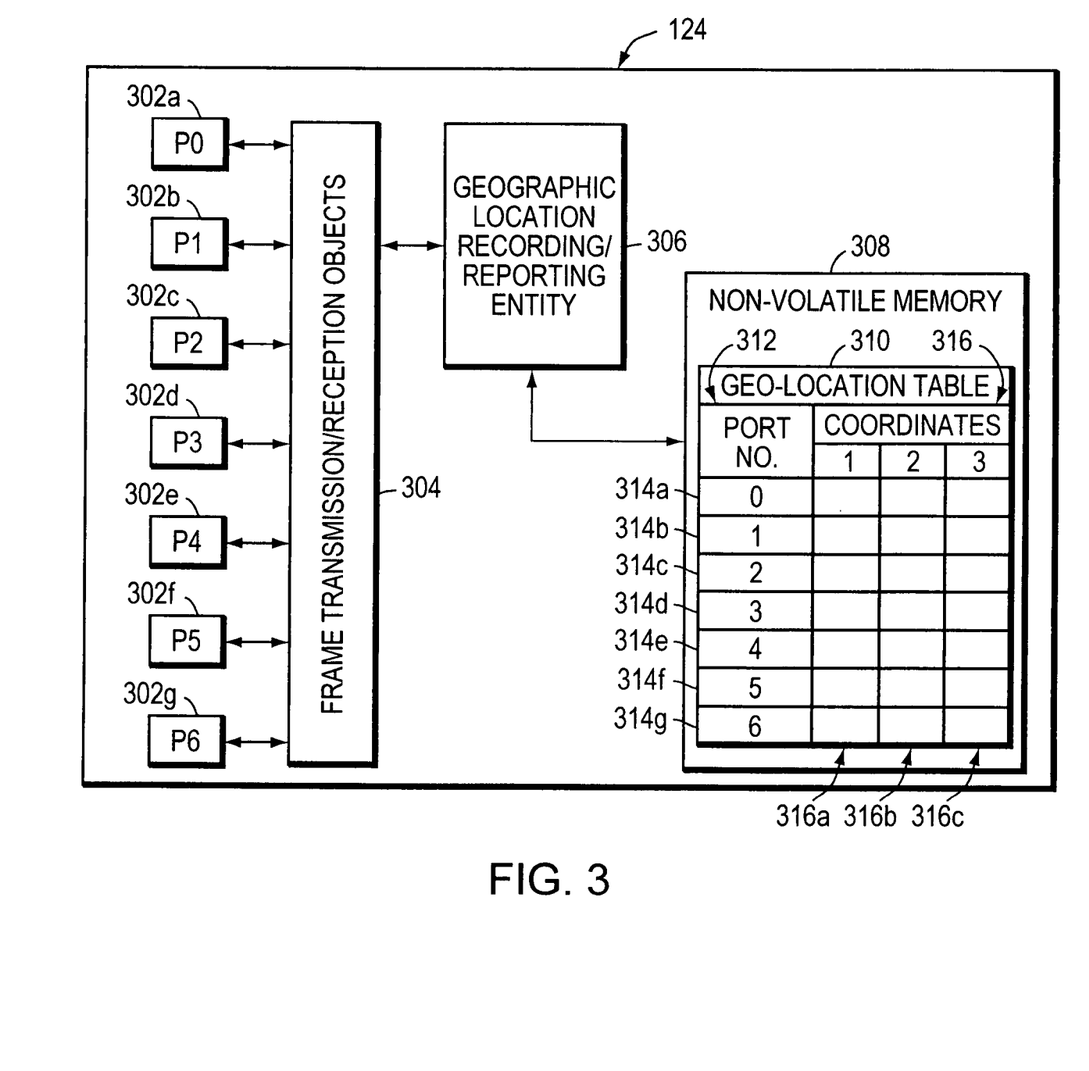
FIG. 3 is a highly schematic block diagram of an intermediate network device configured in accordance with the present invention.

FIG. 3 is a highly schematic, partial block diagram of network switch 124. Switch 124 includes a plurality of ports 302a–302g each of which is preferably identified by a number (e.g., port numbers P0 through P6). One or more frame transmission and reception objects, designated generally 304, are associated with the ports 302 such that network messages, such as data frames and/or packets, received at a given port 302 may be captured and frames to be transmitted by switch 124 may be delivered to a given port 302. Frame reception and transmission objects 304 are preferably message storage structures, such as priority queues. Disposed on switch 124 is a geographic location recording/reporting entity 306 and a memory device, such as a non-volatile random access memory (NVRAM) 308. The location recording/reporting entity 306 is in communicating relationship with the frame transmission and reception objects 304 so that selected messages may be provided to entity 306. Entity 306 is also in communicating relationship with NVRAM 308 so that information, such as physical coordinates, extracted from messages received by entity 306, can be stored at NVRAM 308.

The NVRAM 308 is preferably configured to contain one or more geographic location tables, such as table 310. Table 310 includes a plurality or rows and columns whose intersections define records or cells configured to store data. Specifically, table 310 has a port number column 312 and a series of rows 314a–g, one or each switch port 302. Table 310 further includes a coordinates column 316 that may be divided into a series of sub-columns 316a–c so that multiple coordinates can be stored for each port P0–P6.

In the illustrated embodiment, switch 124 is a computer having transmitting and receiving circuitry and components, including one or more network interface cards (NICs) or line cards establishing ports P0–P6 for the exchange of messages, one or more central processing units (CPUs) and associated memory devices, including NVRAM 308, and one or more bus structures. Suitable network device platforms for use as switch 124, include, but are not limited to, the Catalyst 5000 and 6000 series of switches from Cisco Systems, Inc. of San Jose, Calif. Those skilled in the art will recognize that other network devices, such as bridges, routers, switch-routers, may be advantageously used.

Geographic location recording/reporting entity 306 may comprise registers and combinational logic configured and arranged to produce sequential logic circuits. However, in the illustrated embodiment, entity 306 preferably comprises programmable processing elements containing software programs pertaining to the methods described herein and executable by the processing elements. Other computer readable media may also be used to store and execute the program instructions. Those skilled in the art, moreover, will recognize that other combinations of software and hardware may be utilized to implement the present invention.

Figure 4A:
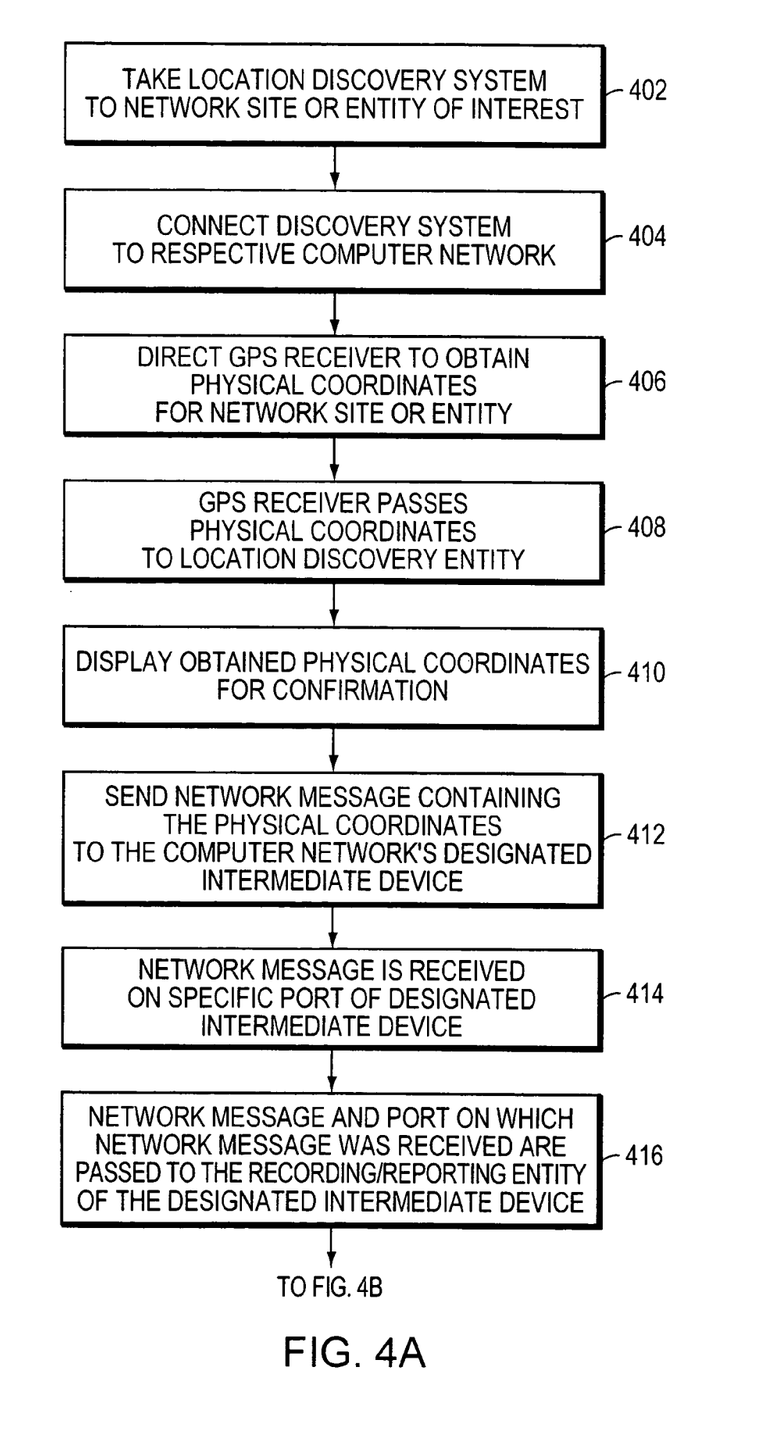
FIGS. 4A–B and 5 are flow diagrams of the method of the present invention.
Figure 4B:
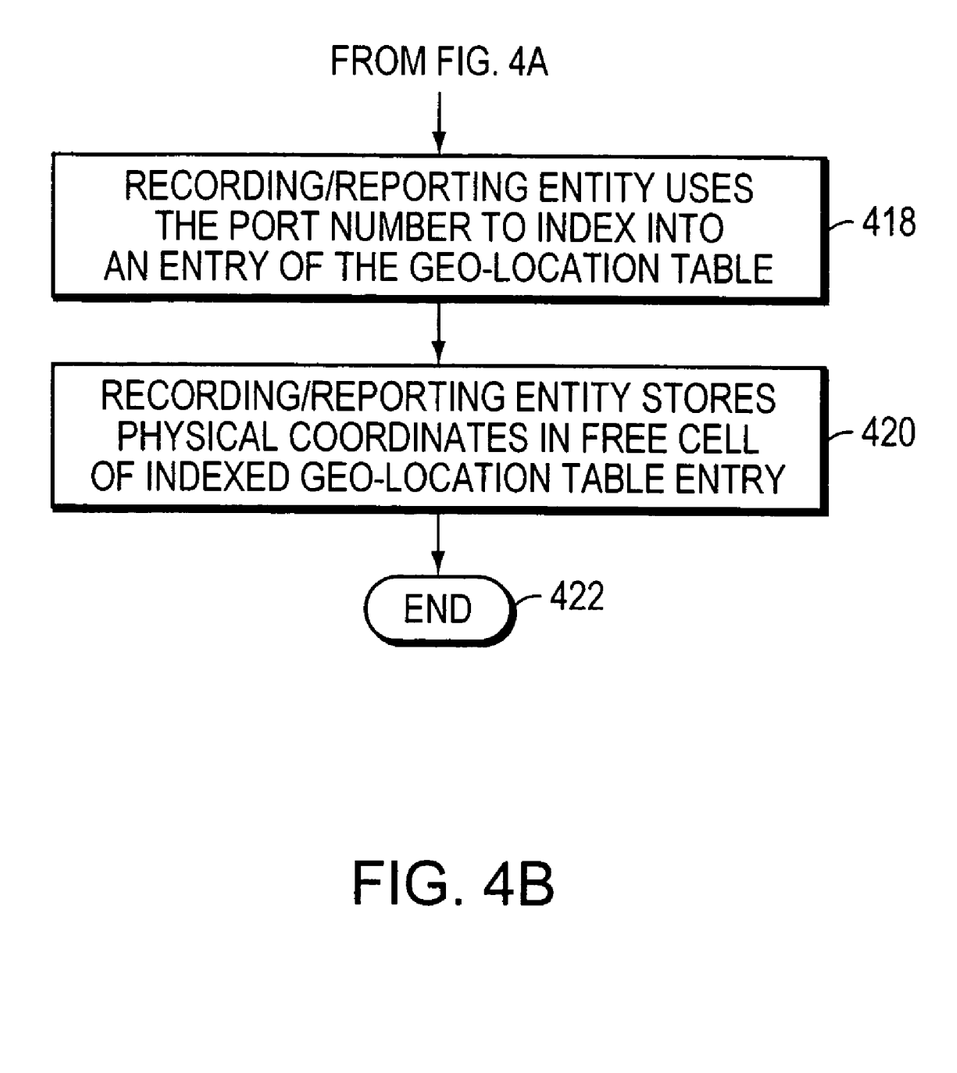

FIGS. 4A–B are a flow diagram of the method of the present invention. Preferably, system 200 in cooperation with switch 124 are used to create a location inventory of all network sites and/or entities that make up a given computer network. First, a network administrator takes the system 200 (i.e., computing unit 202, inertial navigation unit 204 and GPS receiver 206) to the location of the first network site or entity whose location is to be inventoried, as shown at block 402. Suppose, for example, that the network administrator wishes to start with a network entity located in office 102 (FIG. 1). The network administrator brings system 200 into office 102. Next, the network administrator connects computing unit 202 to the network outlet 126 within office 102, as indicated at block 404. For example, the network administrator may connect a cable between network port 212 and network outlet 126. Next, the administrator causes the GPS receiver 206 to obtain geographic location information, e.g., physical coordinates, such as longitude and latitude, for its current position, as indicated at block 406.

In a preferred embodiment, the location discovery entity 208 generates a graphical user interface (GUI) which is displayed on the computing unit's display monitor. The GUI includes a selectable location capture button for activating the GPS receiver 206. The network administrator selects this button and, in response, the discovery entity 208 directs the GPS receiver 206 to monitor the signals from the GPS satellites and compute the physical coordinates of its current position. The physical coordinates are then passed by the GPS receiver 206 to the discovery entity 208 via GPS interface 216, as indicated at block 408. Discovery entity 208 preferably displays the physical coordinates on the GUI for review by the network administrator, as indicated at block 410. The GUI may further include a selectable transmit button for sending the physical coordinates to the switch 124. Assuming the network administrator finds the displayed physical coordinates to be acceptable, he or she selects the transmit button causing the physical coordinates to be sent to the switch 124, as indicated at block 412. Specifically, the discovery entity 208 passes the physical coordinates to the message generator 218, which, in turn, loads them into a network message. The message is passed to the communication facility 210, which drives the message across network port 212 and to the switch 124 via network outlet 126 located in office 102.

Preferably, the network message created by message generator 218 and communication facility 210 is encapsulated in accordance with the well-known User Datagram Protocol (UDP) which is a connectionless transport layer protocol. In the destination port field of the UDP message, message generator 218 preferably loads a transport layer port number that is associated with the location recording/reporting entity 306 (FIG. 3). The UDP message, in turn, is encapsulated within an Internet Protocol (IP) message, and message generator 218 loads the IP address of the switch 124 into the destination IP address field of the IP message.

It should be understood, however, that other message formats may be used. For example, the network message may comply with the Transmission Control Protocol (TCP) layer of the TCP/IP Reference Model, or the network message may simply be an IP message.

The network message carrying the physical coordinates for office 126 traverses the cabling connecting network outlet 126 to switch 124, and is received at a specific port, e.g., port P4, of switch 124, as indicated at block 414. Since the message carries the IP destination address for switch 124, it is not forwarded by switch 124. Instead, switch 124 examines the message's UDP destination port field, and determines that the message is intended for recording/reporting entity 306. Accordingly, the message is passed by the frame transmission/reception objects 304 to the location recording/reporting entity 306, as indicated at block 416. The location recording/reporting entity 306 also receives or is otherwise notified of the port number, e.g., port P4, on which the message was received. Using the received port number, the recording/reporting entity 306 identifies the entry of geo-location table 310 corresponding to port P4, i.e., entry 314e, as indicated at block 418 (FIG. 4B). The location recording/reporting entity 306 then loads the physical coordinates from the message into the first available coordinates sub-field, e.g., sub-field 316a, as indicated at block 420. Having stored the physical coordinates for office 102 at the entry of table 310 associated with port P4, processing is now complete, as indicated by end block 422.

It should be understood that the location recording/reporting entity 306 may be configured to return an acknowledgement message to system 200 confirming error-free receipt of the physical coordinates for office 102. In response, location discovery entity 208 may display an acknowledgement message on the GUI to the network administrator. It should be further understood that the network administrator may enter additional information regarding office 102, such as a number assigned to office 102, the name of the occupant(s) of office 102, identifiers of the network entity or entities located in the office 102, etc., into the GUI. This information is captured by the location discovery entity 208 and may be added to the message that is sent to the switch 124. Geo-location table 310, moreover, can be configured with additional columns for storing this additional information for each switch port entry 314.

Upon completing the location discovery steps for office 102, the network administrator preferably carries the system 200 to the next location to be inventoried, e.g., office 103 whose network outlet 127 may be coupled to port P5 of switch 124. Again, the network administrator uses the GPS receiver 206 to obtain the physical coordinates for this location, which are then transmitted to the switch 124. Switch 124 stores these coordinates in entry 314f of table 310 which is associated with port P5. This process is preferably repeated for all remaining offices 104–112 and for the cubicles 116–117. Thus, for each port 302 of switch 124, geo-location table 310 contains the physical coordinates of the port's termination or end point.

Inertial Navigation

GPS signal reception can be severely degraded inside buildings. Accordingly, depending on the selected office or location, GPS receiver 206 may be unable to compute or derive a current location. Suppose, for example, that the GPS receiver 206 cannot compute the physical coordinates for office 108. The network administrator may learn of the problem through an error message displayed on the GUI by the location discovery entity 208 upon receiving no or invalid physical coordinates from the GPS receiver 206. Alternatively, the network administrator may conclude that the displayed physical coordinates for office 108 are wrong. In this case, the network administrator preferably utilizes the inertial navigation unit 204 to obtain the physical coordinates for office 108.

Figure 5:
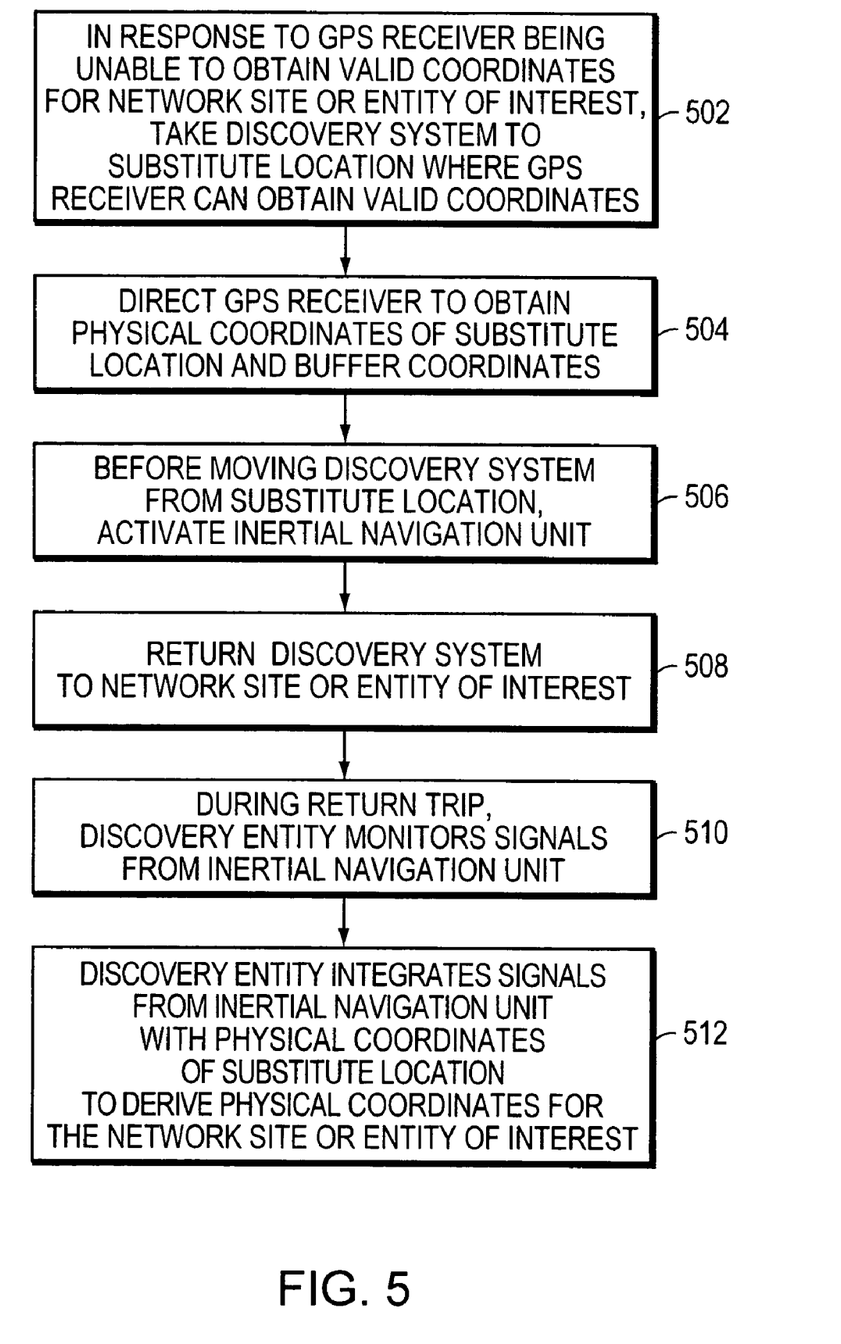

FIG. 5 is a flow diagram of the method of the present invention relying on inertial navigation. If the GPS receiver 206 is unable to obtain valid physical coordinates for a given location, e.g., office 108, the network administrator preferably takes the system 200 to a location where the GPS receiver 206 can obtain valid coordinates, as indicated at block 502. For example, the network administrator may take the system to window 119 where the GPS receiver 206 is better able to receive the satellite signals. The physical coordinates of this location are then captured and buffered by the location discovery entity 208 in location buffer 219, as indicated at block 504. Before moving the system 200 from window 119, the network administrator activates the inertial navigation unit 204, as indicated at block 506. Again, suitable buttons or menus may be displayed on the GUI for selection by the network administrator. With the inertial navigation unit 204 activated and the last valid GPS coordinates buffered, the network administrator carries the system 200 back to the location of interest, e.g., office 108, as indicated at block 508. As the network administrator returns to office 108, the signals produced by the gyros and accelerometers of the inertial navigation unit 204 are monitored by the location discovery entity 208, as indicated at block 510. The information represented by these signals is integrated with the last valid GPS coordinates by the location discovery entity 208 in order to derive valid physical coordinates for office 108, as indicated at block 512.

The ability to integrate inertial navigation signals or information with GPS data is known to those skilled in the art. For example, in their text, *Global Positioning Systems: Inertial Navigation, and Integration*, published December 2000, which is hereby incorporated by reference in its entirety, the authors, Messrs. Grewal, Weill and Andrews, describe a technique using Kalman filtering to integrate inertial navigation with GPS.

The physical coordinates for office 108 as derived by integrating the inertial navigation unit's signals with the last valid GPS data are then transmitted to switch 124, as described above. With the addition of inertial navigation unit 204 and the configuring of discovery entity 208 to integrate signals from unit 204 with the last valid GPS data obtained, system 200 can derive the physical coordinates for any location of interest.

The network administrator may also obtain the physical coordinates of the switch 124 in the same manner as described above. This information is preferably stored by switch at NVRAM 308 either in the geo-location table 310 or in some other data structure. This information can then be supplied to other network devices, such as other switches or routers or end stations, so that a physical rendering of various network devices can be made.

For example, those skilled in the art understand that the Time To Live (TTL) value of IP packets can be manipulated to learn the identity of the intermediate devices disposed along the route from a first network entity to a second entity. Preferably, the first entity issues a series of IP packets each having an incrementally higher TTL value. Upon receiving an IP packet, an intermediate device operating at the IP level decrements the packet's TTL value by one, and checks to see whether the TTL is now zero. If it is, the intermediate device discards rather than forwards the packet. The intermediate device also sends an Internet Control Message Protocol (ICMP) time exceeded error message back to the entity that sourced the packet informing it that the packet has been discarded. The ICMP time exceeded message includes the intermediate device's identity. By issuing an IP packet with a TTL of one, a source entity can determine the identity of the first hop device on the route to the destination entity. By issuing an IP packet with a TTL of two, the source entity can determine the identity of the second hop device along the route to the destination process. This process is preferably repeated until all of the intermediate devices along the route have been identified.

Figure 6:
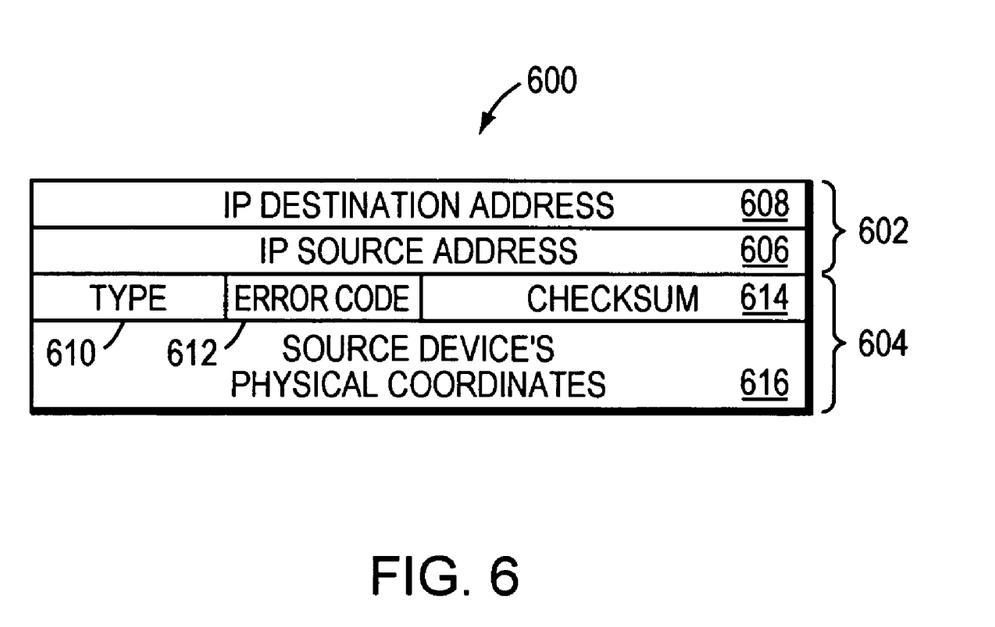
FIG. 6 is a highly schematic block diagram of a network message in accordance with a further aspect of the present invention.

In accordance with a further aspect of the present invention, an extension such as a new field is added to one or more messages of the ICMP protocol, such as time exceeded error messages. FIG. 6 is a block diagram of an ICMP message 600 modified in accordance with the present invention. ICMP message 600 includes an IP header 602 and an ICMP message area 604. IP header 602 includes an IP source address field 606 and an IP destination address field 608, among other fields. ICMP message area 604 includes a type of message field 610, an error code field 612 and a checksum field 614. In accordance with the present invention, ICMP message area 604 is further configured to include a source device's physical coordinates filed 616.

Fields 606–614 are preferably loaded in a conventional manner for ICMP time exceeded message types. As indicated above, field 616 is configured to carry physical coordinates, such as longitude and latitude from a GPS receiver. When an intermediate device generates ICMP message 600 in response to a TTL value being decremented to zero, the device loads its own physical coordinates into field 616 in addition to loading its IP address into field 606. Accordingly, the source entity receives the physical coordinates as well as the identity of the intermediate device. The network administrator can thus determine the physical coordinates of all of the intermediate devices of a given computer network.

Those skilled in the art will also recognize that other alternatives to GPS and/or inertial navigation could be used to derive or otherwise obtain the physical coordinates for the network entities of interest. For example, the GPS receiver 206 and inertial navigation unit 204 could be replaced with a radio beacon.

Figure 7:
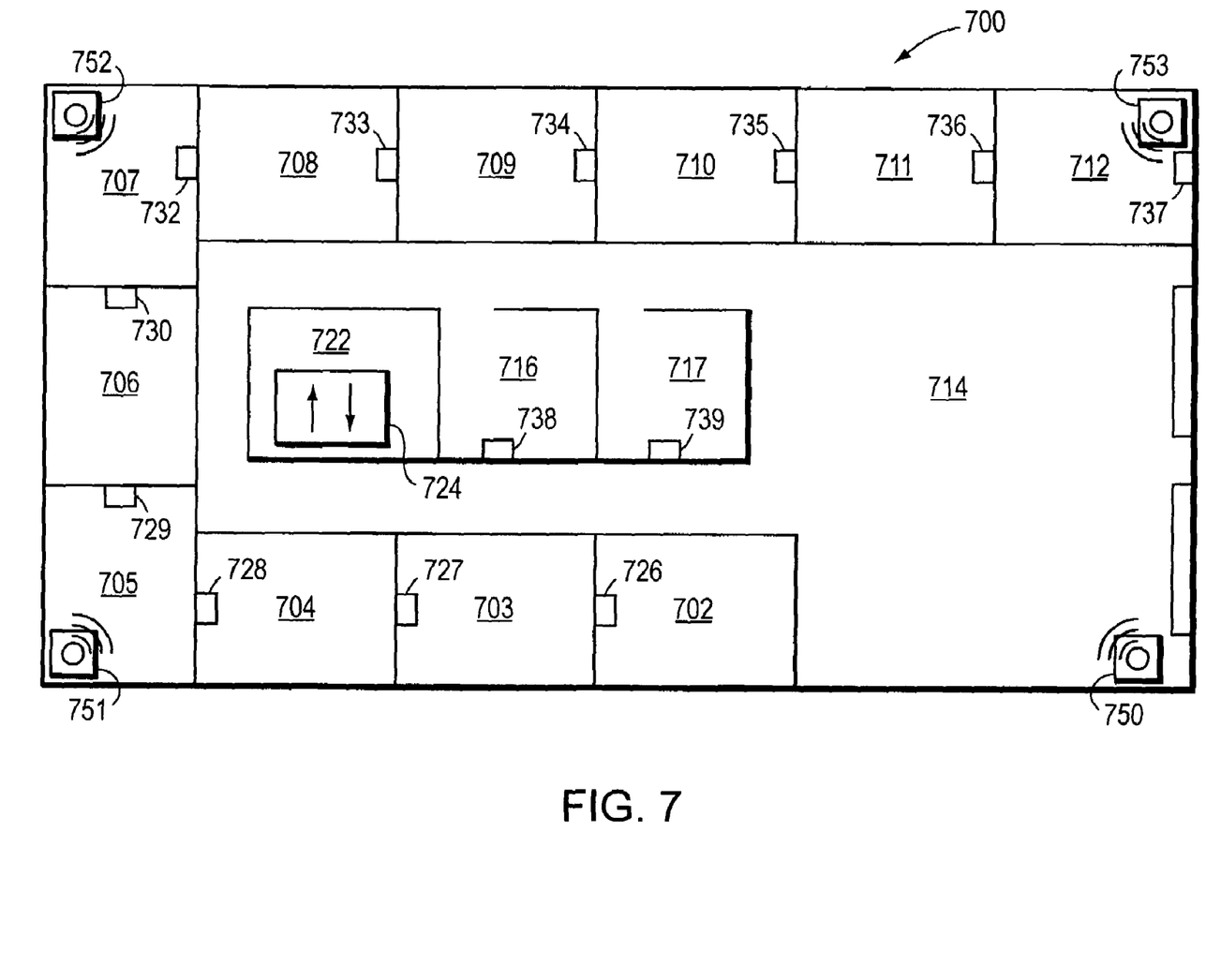
FIG. 7 is a plan view of an office layout for use with an alternative embodiment of the present invention.

FIG. 7 is a plan view of an alternative office layout 700. Office layout 700 includes a plurality of offices 702–712, a lobby 714 and two cubicles 716–717. The office layout 700 further includes a wiring closet 722 containing one or more intermediate network devices, such as a network switch 724. Disposed within each office 702–712 and within each cubicle 716–717 is a network connector or outlet 726–739, which are all radially wired to the wiring closet 722. Each outlet 726–739 is preferably coupled to a respective port of the network switch 724. Also disposed in office layout 700 are a plurality of base stations 750–753. In the preferred embodiment, the base stations are located around the periphery of the office 700. Each base station 750–753 is configured to transmit a radio beacon signal at a selected radio frequency. Encoded within the radio beacon signal from each base station, e.g., station 750, are the physical coordinates of that base station, e.g., station 750. The physical coordinates of the base stations 750–753 may be obtained by including a GPS receiver at each base station 750–753 or by loading the base station's physical coordinates, as determined by a separate GPS receiver, into a memory device or memory structure maintained by the base station.

To determine the physical coordinate for a given location, e.g., office 702, the network administrator takes system 200 (FIG. 2) to the given location, e.g., office 702, and connects the system 200 to the respective network outlet, e.g., outlet 726. Antenna 224 receives the radio beacon signals of the base stations 750–753 and provides those signals via antenna interface 226 to the discovery entity 208. The discovery entity 208, moreover, is preferably configured to "listen" for the radio beacon signals transmitted by the base stations 750–753. Using conventional triangulation techniques that are well known to those skilled in the art, or more sophisticated radio signal processing techniques, such as circularly polarized transmission signals as described in J. Whitaker, *Radio Frequency Transmission Systems: Design and Operation* (1991), which is hereby incorporated by reference in its entirety, the discovery entity 208 computes its location, i.e., the physical coordinates of office 702, provided that it can "hear" the radio beacon signals from at least three base stations 750–753. The computed physical coordinates are then sent to the network switch 724 and stored at geo-location table 310, as described above.

The system 200 is then moved to the next location of interest, e.g., office 703 and the process is repeated.

Base stations 750–753 are preferably portable so that they may be easily set-up and used to generate a location inventory of office 700, and then removed for use in another area.

Those skilled in the art will recognize that other methods, such as Ultra Wideband (UWB) radio signals, laser triangulation, etc., may be used to obtain the physical coordinates of the locations of interest.

Enhanced 911 Service

The present invention can also be used to facilitate Enhanced 911 (E911) emergency service calls from Voice over Internet Protocol (VoIP) telephones. Suppose, for example, that a VoIP telephone is disposed in one or more offices, e.g., office 105, and that the phone is coupled to network switch 124 via network outlet 129. Switch 124 is preferably configured with circuitry and/or software for detecting the initialization of a VoIP telephone call. For example, switch 124 may include the Network-Based Application Recognition (NBAR) engine from Cisco Systems, Inc., which is described in *Overview Network-Based Application Recognition*, posted by Cisco Systems, Inc. on Aug. 24, 2000, and hereby incorporated by reference in its entirety. The NBAR engine is preferably configured to detect the occurrence of a 911 "call" from office 105. In response, switch routes the 911 "call" to the appropriate Public Safety Answering Point (PSAP) just like a conventional telephone switch. In addition, however, switch 124 also accesses its geo-location table 308. Specifically, switch 124 retrieves the physical coordinates for the port, e.g., P3, on which the 911 call originated. These physical coordinates are then either appended to the 911 "call" being routed to the PSAP or they may be sent in a separate message to the PSAP. In either case, the 911 operator at the PSAP receives the physical coordinates for the location at which the 911 call originated, e.g., office 105. Using these physical coordinates, the operate can then direct emergency personnel to the correct location.

If the 911 "call" already has physical coordinates appended to it, then switch 124 concludes that the call did not originate from an VoIP phone directly coupled to switch 124. In this case, switch 124 does not append additional physical coordinates to the call. Alternatively or in addition, switch 124 may be configured to "know" which ports are directly coupled to VoIP telephones and which are coupled to other intermediate network devices. Here, physical coordinates would only be appended to 911 calls from directly coupled VoIP telephones.

Alternatively, the VoIP telephone at office 105 could query the network switch 124 and receive its physical coordinates. This could take place, using one or more special ICMP messages, as soon as the VoIP telephone is connected to the switch 124. It could also be performed as part of a conventional network discovery protocol, such as the Cisco Discovery Protocol (CDP) from Cisco Systems, Inc. When switch 124 receives such a query on a give port, it performs a look-up on its geo-location table 310. The matching physical coordinates are then returned to the querying device.

When making a 911 call, the VoIP telephone can append its physical coordinates as obtained from the network switch 124. For example, these physical coordinates can be loaded into one more messages defined by a call signaling protocol, such as H.323, Session Initiation Protocol (SIP), Media Gateway Control Protocol (MGCP) or MEGACO, which is an alternative to MGCP, among others.

The physical coordinates could also be loaded into one or more fields that have been specifically defined to carry location information, such META tags embedded in Hyper Text Mark-up Language (HTML) files. For example, the Internet Engineering Task Force (IETF) Internet Draft document entitled *Geographic Registration of HTML Documents* dated April 2001, describes a plurality of geo-tags into which the location information of the present invention could be loaded.

The foregoing description has been directed to specific embodiments of this invention. It will be apparent, however, that other variations and modifications may be made to the described embodiments, with the attainment of some or all of their advantages. For example, system 200 may only have a GPS receiver and not an inertial navigation unit. Those skilled in the art will recognize that other combinations are also possible. Therefore, it is an object of the appended claims to cover all such variations and modifications as come within the true spirit and scope of the invention.

What is claimed is:

1. A method for discovering and maintaining geographic location information for network devices, the method comprising the steps of:
   interconnecting a first network device to a particular port of an intermediate network device, the first network device including a location generator configured to determine physical coordinates corresponding to the location of the first network device;
   transmitting, by the first network device, a message including the physical coordinates of the first network device to the intermediate network device, the intermediate network device receiving the messages on a particular port;
   storing the physical coordinates at a memory location of the intermediate network device, the memory location associated with the particular port;
   subsequent to the step of transmitting, disconnecting the first network device from the particular port and interconnecting a second network device to the particular port, the second network device located at substantially the same location as previously occupied by the first network device; and
   determining the physical location of the second network device by accessing the memory location associated with the particular port.

2. The method of claim 1 wherein the second network device lacks internal capability of determining physical coordinates.

3. The method of claim 1 further comprising the step of:
   transmitting the physical coordinates to the second network device in response to a request by the second network device.

4. The method of claim 1 further comprising the step of:
   appending the physical coordinates to an emergency call to a third network device, the emergency call originated by the second network device.

5. The method of claim 1 further comprising the step of:
   passing the physical coordinates from the intermediate network device to a second intermediate network device, to be stored at the second intermediate network device.

6. The method of claim 5 wherein the step of passing further comprise the steps of:
   generating an Internet Control Message Protocol (ICMP) message;
   loading the physical coordinates into the ICMP message; and
   sending the ICMP message to the second intermediate network device.

7. The method of claim 1 wherein the first network device is a portable computing unit and the second network device is a Voice over Internet Protocol (VoIP) phone.

8. The method of claim 7 wherein intermediate network device is a network switch.

9. An intermediate network device configured to maintain geographic location information for network devices, comprising:
   a geographical location recording/reporting entity configured to communicate with a first network device coupled to a particular port of the intermediate network device, and configured to receive from the first network device physical coordinates corresponding to the location of the first network device;
   a non-volatile memory configured to store the physical coordinates in one or more memory locations associated with the particular port, the physical coordinates thereby associated with the particular port; and
   the geographical location recording/reporting entity is further configured to, in response to receiving a request from a second network device coupled to the particular port, assume the second network device is located at substantially the same location as the first network device, and transmit the physical coordinates to the second network device.

10. The intermediate network device of claim 9 wherein the non-volatile memory includes a geo-location table indexed by port number, and wherein the memory locations associated with the particular port are part of the geo-location table.

11. The intermediate network device of claim 9 wherein the geographical location recording/reporting entity is further configured to append the physical coordinates to an emergency call to a third network device, the emergency call originated by the second network device.

12. A method for discovering and using the geographic location information with a Voice over Internet Protocol (VoIP) telephone, the method comprising the steps of:
   interconnecting the VoIP telephone to a particular port of a network switch, the particular port associated with a memory entry in a memory of the network switch, the memory entry storing predetermined physical coordinates for use with any network device interconnected to the particular port;
   receiving the physical coordinates at the VoIP telephone from the intermediate network device; and
   appending, by the VoIP telephone, the physical coordinates to at least one call message transmitted by the VoIP telephone.

13. The method of claim 12 wherein the at least one call is part of an emergency call to a Public Safety Answering Point (PSAP).

14. The method of claim 12 further comprising the step of:
   requesting, by the VoIP telephone, the physical coordinates from the switch.

15. The method of claim 14 wherein the step of requesting further comprises the step of:
   transmitting one or more Internet Control Message Protocol (ICMP) messages to the network switch.

16. A computer readable medium containing executable program instructions for discovering and using geographic location information with a Voice over Internet Protocol (VoIP) telephone, the executable program instructions comprising program instructions adapted for:
   transmitting a message from the VoIP Telephone to a particular port of a network switch that is interconnected to the telephone, the message requesting physical coordinates for the VoIP telephone;
   in response to the message, receiving the physical coordinates from the switch at the VoIP Telephone;
   appending, by the VoIP telephone, the physical coordinates to an emergency call transmitted by the VoIP telephone.

17. The computer readable medium of claim 16 wherein the emergency call is to a Public Safety Answering Point (PSAP).

* * * * *